(12) United States Patent
Fiatal

(10) Patent No.: US 9,323,862 B2
(45) Date of Patent: *Apr. 26, 2016

(54) PREDICTIVE CONTENT DELIVERY

(71) Applicant: Seven Networks, LLC, San Carlos, CA (US)

(72) Inventor: Trevor Fiatal, Fremont, CA (US)

(73) Assignee: Seven Networks, LLC, Marshall, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/623,518

(22) Filed: Feb. 17, 2015

(65) Prior Publication Data

US 2015/0161285 A1    Jun. 11, 2015

Related U.S. Application Data

(63) Continuation of application No. 12/348,136, filed on Jan. 2, 2009, now Pat. No. 9,002,828.

(51) Int. Cl.
*G06F 17/30* (2006.01)

(52) U.S. Cl.
CPC .... *G06F 17/30902* (2013.01); *G06F 17/30106* (2013.01); *G06F 17/30132* (2013.01); *G06F 17/30761* (2013.01); *G06F 17/30764* (2013.01); *G06F 17/30864* (2013.01)

(58) Field of Classification Search
CPC .................. G06F 17/30761; G06F 17/30864; G06F 21/50; G06F 17/30764; G06F 17/30902; G06F 17/30106; G06F 17/30132; G06F 17/30964
USPC .......... 707/706, 721, 723, 732, 733, 734, 751
See application file for complete search history.

(56) References Cited

U.S. PATENT DOCUMENTS

| | | | |
|---|---|---|---|
| 7,958,204 B1 | 6/2011 | Phillips et al. | |
| 2006/0122976 A1* | 6/2006 | Baluja et al. | 707/3 |
| 2006/0156209 A1* | 7/2006 | Matsuura | G06Q 10/10 714/798 |
| 2006/0282408 A1* | 12/2006 | Wisely et al. | 707/3 |
| 2007/0198488 A1 | 8/2007 | Altounian et al. | |
| 2008/0005695 A1* | 1/2008 | Ozzie et al. | 715/811 |
| 2008/0008095 A1* | 1/2008 | Gilfix | 370/235 |
| 2008/0200161 A1* | 8/2008 | Morse et al. | 455/418 |
| 2008/0207182 A1* | 8/2008 | Maharajh et al. | 455/414.1 |
| 2008/0242279 A1 | 10/2008 | Ramer et al. | |
| 2009/0043741 A1* | 2/2009 | Kim | 707/3 |

(Continued)

OTHER PUBLICATIONS

Non-Final Office Action mailed Jul. 14, 2014 for application No. 12/348,136.

*Primary Examiner* — Rehana Perveen
*Assistant Examiner* — Tiffany Thuy Bui
(74) *Attorney, Agent, or Firm* — NK Patent Law, PLLC

(57) ABSTRACT

A method of predictive content delivery to a mobile device over a wireless network is provided. The method includes sending, by a mobile device, a search query for content stored at a computing device, receiving search results from the computing device, wherein the search results are for selection by a user of the mobile device, and receiving selected content corresponding to certain of the search results, wherein the content corresponding to the certain of the search results is not delivered to the mobile device among the certain search results but is to be pre-loaded on the mobile device before being requested by the user of the mobile device. The content corresponding to the certain of the search results is selected according to network performance of the wireless network.

52 Claims, 2 Drawing Sheets

(56) References Cited

U.S. PATENT DOCUMENTS

| | | | |
|---|---|---|---|
| 2009/0055353 A1* | 2/2009 | Meema | 707/3 |
| 2010/0149975 A1 | 6/2010 | Tripathi et al. | |
| 2010/0169262 A1* | 7/2010 | Kenedy | G06F 17/30867 706/50 |

* cited by examiner

PREDICTIVE CONTENT DELIVERY

CROSS-REFERENCE TO RELATED APPLICATIONS

This application is a continuation of U.S. patent application Ser. No. 12/348,136 filed Jan. 2, 2009 and entitled "Predictive Content Delivery", the disclosure of which is incorporated herein by reference.

The present application is related to U.S. patent application Ser. No. 12/002,300 filed Dec. 13, 2007 and entitled "Content Delivery to a Mobile Device from a Content Service" the disclosure of which is incorporated herein by reference.

BACKGROUND

1. Field of the Invention

The present invention generally relates to wireless mobile devices. More specifically, the present invention relates to searching for content stored at a remote location via a mobile device and efficiently delivering desired content to the mobile device from that remote location.

2. Description of Related Art

Mobile devices are becoming all inclusive computing devices. Mobile devices are no longer limited to operation solely as a mobile phone and even as a personal digital assistant ("PDA"). With increased processing and battery power and improved display and interface functions, mobile devices are now expected to serve as a 'laptop on the go.' Mobile devices are expected to provide not only telephony and/or PDA functions but near-instant access to multimedia and other on-demand content.

Notwithstanding the technological advances in mobile devices, they are not without their limitations. Mobile devices tend to have less processing power, less memory, and more bandwidth constraints as compared to a desktop or laptop computer. Memory constraints may be satisfied by using the mobile device as a client communicatively coupled to a server, which may be nothing more than a home computer with greater storage capacity. While offloading of data solves mobile device memory issues, the shifting of storage responsibilities gives rise to other issues including those related to bandwidth, processing, and on-demand access to such content.

For example, a user may store all of their personal photos at a desktop computer having been configured with a remote access application. This remote access application may allow for access and control of the desktop computing device via a mobile device. The user of the mobile device is then required to search through dozens if not hundreds of photographs at the computing device. While such search activities may be taken for granted when sitting in front of a laptop, attempting to navigate various levels of files may prove difficult on a device with a limited user interface.

Retrieving content from the server/home computing device may prove similarly difficult and/or laborious. A home computer possesses a powerful central processor (or processors) that allow for desired content to be readily accessed, retrieved, and viewed. That same content, when transported to a mobile device, must be identified at the home computer via the mobile device, prepared for transport over an intermediate communications medium (or media), received by the mobile device, stored at the mobile device, retrieved for viewing, and ultimately rendered or executed by the mobile device.

Some files are very large such as music files or high quality photographs. These files will consume a great deal of bandwidth. Similarly, a desktop computer tends to be configured with any number of media execution applications to allow for seamless access and rendering of content. Some applications may not be present on a mobile device for any number of reasons, including processing power and memory constraints.

As such, there is a need in the art for ease of access to content stored at a central storage device and that may be accessed by a mobile device having more limited computational and/or display abilities than that central computing device.

SUMMARY OF THE CLAIMED INVENTION

A method for predictive content retrieval is recited. A search query is received at a computing device storing content. The search query is generated at a mobile device. In response to the search query, search results are provided. The search results are provided to the mobile device by the computing device storing content. Content is retrieved from storage at the computing device followed by receipt of a user request at the computing device storing content. The user request identifies content previously identified in the search results. Content is delivered to the mobile device, the delivered content being responsive to the user request and retrieved from storage prior to the user request identifying the content.

A related mobile device is also provided.

DETAILED DESCRIPTION

Figure 1:
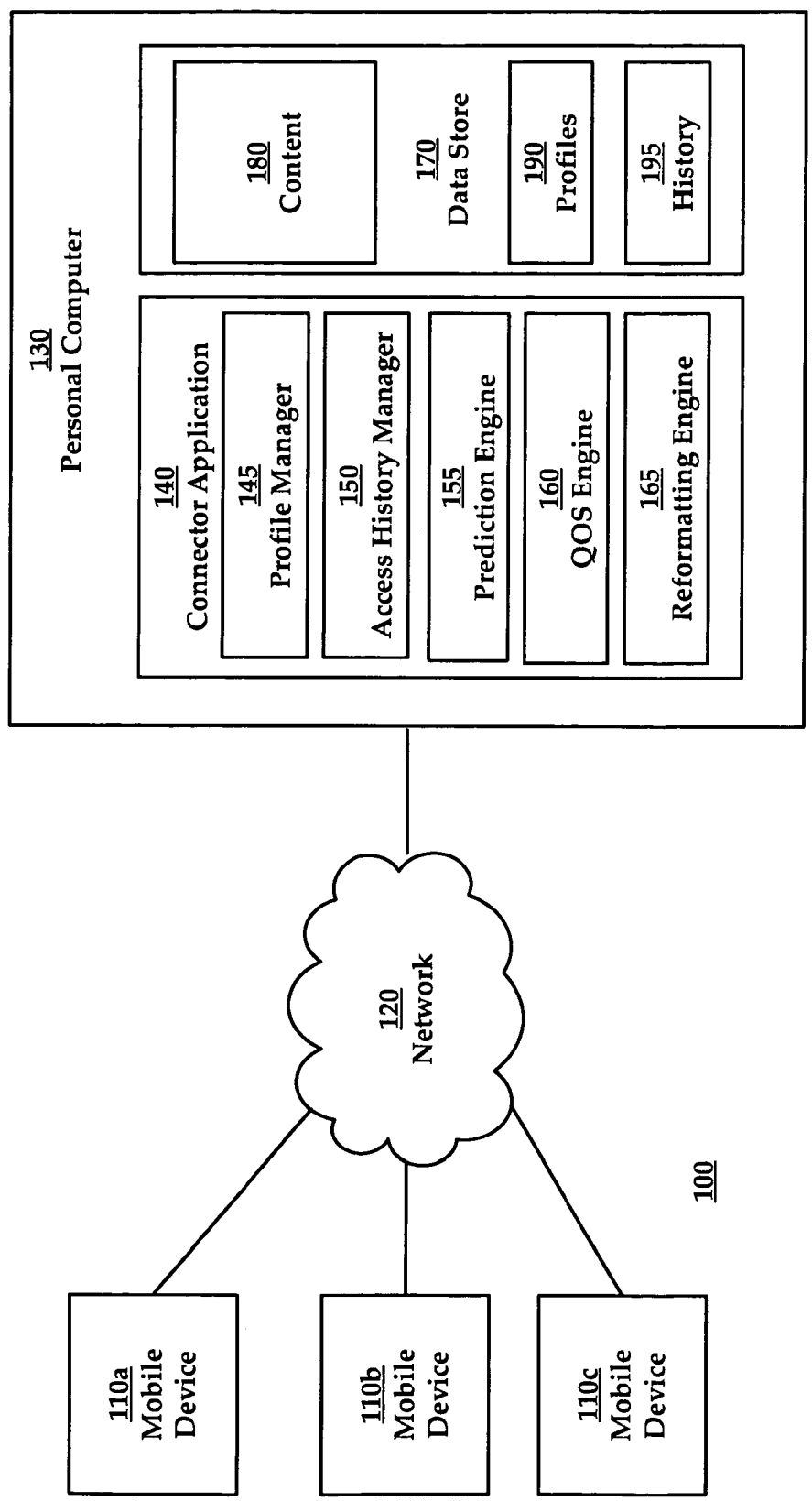
FIG. 1 depicts an exemplary system for implementing search requests initiated by a mobile device.

FIG. 1 depicts an exemplary system 100 for implementing search requests initiated by a mobile device. System 100 of FIG. 1 includes mobile device 110 communicatively coupled a data store (personal computer 130) via network 120. Personal computer 130 includes a connector application 140 and content 180 as will be further described herein. Additional components may be introduced to system 100 such as billing application servers or third-party application servers. The computing devices referenced in FIG. 1 are inclusive of the necessary processing devices and memory to allow for storage and execution of the various applications described herein.

Network 120 is inclusive of any variety of communications networks including geographically dispersed telecommunications networks such as a Wide Area Network (WAN) or the Internet, intermediate networks restricted to a metropolitan area such as a Metropolitan Area Network (MAN), and interconnected workstations within a relatively small geographic area such as a Local Area Network (LAN). Network 140 may be homogeneous or heterogeneous with respect to any particular communications medium (e.g., wireless or landline) and may overlap with or be shared by various service providers. Various hardware components (e.g., base stations, routers, and so forth) may be implemented in network 120.

Mobile device 110 is inclusive of any portable device used for mobile communications. Examples of a mobile device 110 include a PDA and Internet-enabled cellular phones or Smart Phone. Mobile device 110 is capable of network connectivity such that it may exchange information with other computing devices over network 120.

Mobile device 110 may include any number of customized applications (e.g., media players or certain applications that may be required to interact to connector application 140). Mobile device 110 may likewise include one or more generalized software applications such as web browsers and electronic-mail applications that allow for or facilitate data exchanges. Mobile device 110 may include a 'search' application to allow a user to search for content 180 at data store (personal computer 130). The 'search' application may be a client-side user-interface application related to connector application 140.

Data store (personal computer 130) is a computing device on the network 120 capable of processing search requests generated by the mobile device 110. Data store (personal computer 130) may translate a search request originated in a format native to mobile device 110 into a format comprehensible by data store (personal computer 130). Data store (personal computer 130) may be further configured to identify a sub-set of data from search results generated in response to the aforementioned search request and that correspond to a search constraint related to a mobile device profile, network service provider policy, or user profile. The aforementioned functionalities may be embodied in a software module or engine executable at the data store (personal computer 130). Data store (personal computer 130) may further include executable applications for interacting with connector application 140.

Data store is not limited to a personal computer. Data store may be a storage server managed by an enterprise or content service. For the purpose of the present discussion, data store will be exemplified as a personal computer 130. Content server 120 may also be capable of executing searches of content sources 150 for content and that correspond to a search request generated by mobile device 110.

Personal computer 130 includes content 180. Content 180 is inclusive of any and all types of content that may be stored in an electronic storage medium. For example, content 180 may be photographs or videos. Content 180 may also be audio files. Content 180 may also be more traditional 'office' documents such as PowerPoint™ presentations, spreadsheets, and word processing documents. Content 180 may be stored in any organizational hierarchy (e.g., an ordered file system such as 'Music,' 'Genre,' 'Artist,' 'Album,' 'Track Name') including the lack of any such hierarchy (e.g., all files randomly saved to a 'desktop').

Personal computer 130 includes a connector application 140 that is executable by a processor. Connector application 140 facilitates interaction with a mobile device 110 associated with or otherwise having access to the personal computer 130. Connector application 140 may, in this regard, be responsible for managing access permissions and/or assisting in the negotiation of a session between the personal computer 130 and mobile device 110.

The connector application 140 of FIG. 1 includes a number of subsidiary applications: profile manager 145, access history manager 150, prediction engine 155, Quality of Service (QOS) engine 160, and reformatting engine 165. Connector application may operate in conjunction with data store 170 to store and retrieve data, including content 180 and profile 190 and access history 195. Data store 170 is inclusive of any storage medium known in the art and that may be utilized by a general purpose computer (such as personal computer 130) or even more specialized computing devices such as network servers. Subsidiary applications may be an integrated part of the connector application 140 or independent applications or modules linked to connector application 140.

Execution of the profile manager 145 allows for the connector application to access user profile data 190 as may be stored in data store 170. A profile may be unique to personal computer 130 (i.e., no one else uses the computer) or may be determined through any number of indicia provided by or derived from mobile device 110. For example, various unique identifiers may be associated with the mobile device 110 including an IP address, a mobile identification number (MIN), or electronic identification number (EIN). A personal identification number (PIN) and subscriber identity module (SIM) card combination may also be used. Other information may be stored on the SIM card and used as an identifier of the mobile device 110 as that device concerns a user profile. Traditional user names and/or passwords as may be entered at the mobile device 110 or that may be provided in a token may also be used. A telephone number of the mobile device 110 may likewise be used.

User profile data 190 may indicate user preferences for particular types of content. A user profile may indicate that the corresponding user prefers a particular genre of music or a particular artist. The profile may indicate a preference for particular pictures. The user profile may also indicate capabilities of a mobile device associated with the user (e.g., applications on the mobile device or other hardware specifications). A user may manually update the profile to indicate mobile device properties or certain data provided may be gleaned during the normal course of operation (e.g., requests for WMV files may indicate the ability for the device to execute WMV files and/or the lack of an error message in response confirms the same).

When the user associated with a particular profile logs in or begins accessing the personal computer 130 via the connection application 140, the profile manager 145 loads the corresponding profile data 190 from data store 170. Based on information in the profile data 190, the connection application 140 may begin pre-fetching certain content 180 that corresponds to the requirements and/or limitations of that profile 190. For example, if the profile data 190 for a user indicates that the mobile device may only execute WMV files, then all non-WMV video files may be excluded from search or other processing procedures. Further, the profile may indicate certain 'favorites' such as particular photos or audio files. The connection application 140 may queue those favorite files from content 180 such that they are available for on-demand delivery to the user.

Execution of the access history manager 150 tracks the history of content requested by a user. History manager 150 may operate in a fashion similar to a 'history' file in a web browser. Access history data 195 tracked by the history manager 150 may be stored in data store 170. Access history data 195 may be associated with a user profile by the connection application 140 in order to pre-load content 180 for immediate access.

Execution of the prediction engine 155 implements certain intelligence in the connection application 140 in order to identify non-explicit trends. A user may consistently listen to a series of music files not because the user is particular to those individual songs but the artist that performs them. The prediction engine 155 may identify the fact that only files of a certain format or bit rate are searched and retrieved by the user. Prediction engine 155 may utilize data and/or metadata from various sources in order to derive certain trends. The prediction engine 155 may then predict that content that might next be requested prior to the user actually requesting the content. Predictions may be based on a sample set from a single session or a series of sessions. Predictions may expire over time or be renewed if a prediction proves to be accurate on a regular basis. Predictions may be associated with a user profile 190.

Prediction engine 155 may also identify content based on a distribution curve such as the location of a file in a file structure. A file structure may have four levels. The second, third, and fourth levels are a sub-level of the first level. The third and fourth levels are a sub-level of the second level, which is a sub-level for first level. The fourth level is a sub-level of the third level, which is a sub-level of the second level, which is a sub-level of the first level. Various pieces of content may be stored in folders at each of the levels. Content in a higher level may be deemed more likely to be accessed than files in a lower level as those files take longer and are more difficult to access through a traditional file structure.

Prediction engine 155 may likewise identify those content files that have been more recently accessed. A content file saved to storage versus a content file saved some time ago may likewise indicate content more likely to be retrieved. File folders in the aforementioned file system that have been more recently accessed may likewise indicate content more likely to be retrieved.

Quality of Service (QOS) engine 160 examines conditions in a network and/or performance issues at the personal computer 130 and/or mobile device 110 with respect to early loading of particular content, exclusion of searches or loading for certain content, or aiding the prediction engine 155 with respect to determining what content should or should not be loaded. For example, if bandwidth quality is extremely poor, certain high bandwidth content may be excluded from searches. Alternatively, if the prediction engine 155 determines that the user will request that certain high bandwidth content notwithstanding the poor network quality, it may allow for the content to start being streamed prior to an actual request such that the content is already partially stored on the mobile device when the user requests the same. The QOS engine 160 may determine that the content may be altered as to better address the particularities of the network environment as may be accomplished through the execution of the reformatting engine 165. The QOS engine 160 may also determine that processor performance is sluggish on the mobile device or personal computer in response to certain performance metrics that may be periodically generated and/or requested.

Reformatting engine 165 may be executed as to reformat content 180 in the data store 170. The reformatting engine 165 may decode, encode, transcode, and/or resample content 180 in data store 170. The reformatting engine 165 may initiate reformatting of content in order to bring the content within the limitations of a network condition as identified by QOS engine 160 or to comply with the particularities of a user profile 190. For example, a mobile device 110 may not support ACC format while supporting the MP3 format. The reformatting engine 165, in response to this indication as identified in a user profile or from device feedback, may reformat content identified as being desired by the user through prediction engine 155, access history 195, or an explicit indication in the user profile.

The reformatting engine 165 may reformat an MPEG-2 encoded video file to a 3GP encoded video file by copying the MPEG-2 encoded video file and saving the copied video file as a 3GP encoded video file following transcodings of the same. In a further example, the reformatting engine 165 may reformat an AVI encoded video file having a resolution of 720 by 480 pixels to an AVI encoded video file having a resolution of 360 by 240 pixels. In a third example, the reformatting engine 165 may reformat an MPEG-4 encoded video file having a frame rate of approximately 30 frames per second (fps) to an MPEG-4 encoded video file having a frame rate of approximately 15 fps. The reformatting engine 165, in a still further example, may reformat an MP3 encoded audio file having a bit rate of 192 kilobits per second (kbps) to an MP3 encoded audio file having a bit rate of 128 kbps.

Content reformatting may be a factor dependent conversion related to the network service provider constraint or the capabilities of mobile device 110. Examples of such factors are available storage space, a user-selectable preference, supported codecs, bit rates, sampling rates, sample resolutions, or video frame rates. Other factors warranting conversion also include memory size, free available memory, screen size, and a screen resolution of the mobile device 110.

Search requests may be initiated by the mobile device 110. Search requests may identify desired content such as artists, titles, genres, or series. Search requests generated by the user of mobile device 110 may generally correspond to search requests as may be input to any commercial search engine as is known in the art. The search request generated by the mobile device 110 is then sent to the personal computer 130. The personal computer 130 returns results to the mobile device 110.

In anticipation of certain content being selected for retrieval in response to the search request, the personal computer 130 may pre-fetch content and/or format content such that the content is immediately available for transfer to the mobile device 110 upon selection by the user. As a result, content may be more quickly transferred to the mobile device 110. These determinations may be made by execution of one or more of the aforementioned managers or engines at the connector application 140 including the prediction engine 155.

Portions of content identified in the search request may be transferred by the personal computer 130 prior to the content actually being selected for delivery (e.g., the first ten seconds of content). Thus, while a user listens to the first ten seconds of content, the remainder of a particular content selection may be transferred to the user. Because the first ten seconds are already present on the mobile device 110, playback may begin immediately notwithstanding the ongoing transfer of the remaining portions of content. As such, content playback is instant notwithstanding the remote storage of the original content file at the personal computer 130.

In some embodiments, the aforementioned managers or engines at connector application 140 including the prediction engine 155 may be a part of the content search process. If content cannot be delivered because of bandwidth conditions and/or played at the mobile device 110 because of device restrictions (e.g., format or device conditions), then there is no point in identifying the file to the user for potential selection when the content cannot be played back. Use of connector application 140 to filter search results as suggested above may also occur in the context of content deliver, which would also involve the various managers or engines at the connector application 140. The connector application 140 may have dual usage in such an embodiment (search and predictive fetching).

Figure 2:
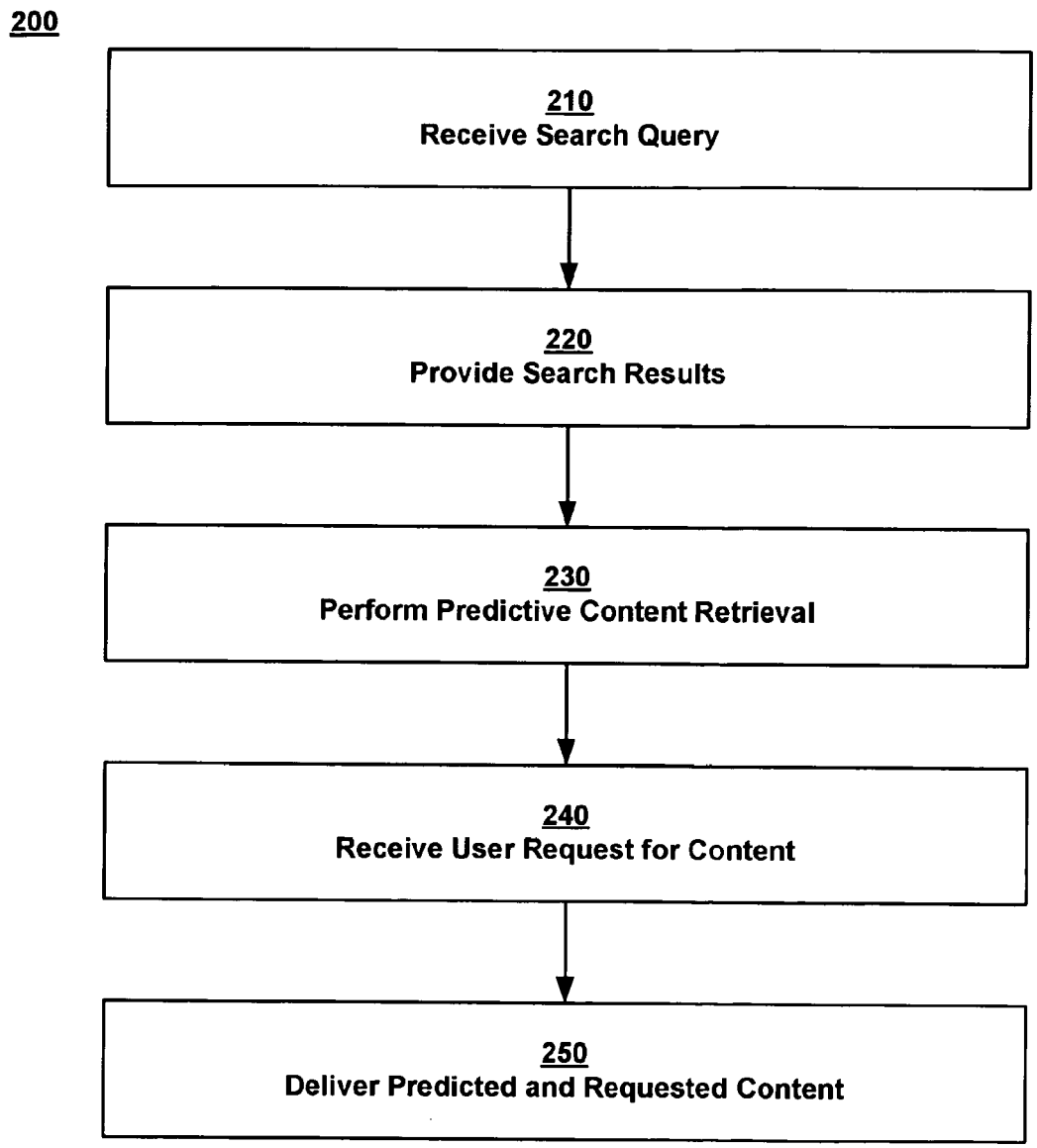
FIG. 2 depicts an exemplary method for performing predictive content searches for the delivery of content to a mobile device.

FIG. 2 depicts an exemplary method 200 for performing content searches initiated by a mobile device. As noted in the context of FIG. 1, all of the content available at a content source and that falls within a user generated search request may not be useful or accessible to the mobile device user. In order to provide useful search results (i.e., search results that correspond to content actually accessible to the user), the search results need to be processed to correspond to any number of search constraints. Identifying content that is or that would violate one of the aforementioned search constraints (i.e., user preferences, device capabilities, network service provider constraints) is not useful. Further, providing this content (and allowing a user to select the same for delivery) may result in operational difficulties at mobile device 110 (e.g., application failures) or incur unwanted costs on the user (e.g., penalties for exceeding network bandwidth allocations). This non-useful content may be removed from the search results provided to the user of the mobile device 110.

In step 210, a search query is received at the personal computer 130 or other content storage source. Queries are generated at mobile device 110 with respect to identifying what content is available at the personal computer 130. Queries may include artists, user, song title, or other information that may be useful with respect to locating and retrieving content. Login or access credentials may need to be provided to the personal computer 130 as a prerequisite with respect to performing a search or accessing any content at the personal computer 130.

In step 220, the personal computer 130 provides results that are responsive to the query generated at the mobile device 110. The search results may be inclusive of all content at the personal computer 130 and that is responsive to the search query. The search results may alternatively be inclusive of all content at the personal computer 130 but that further meet a network or device restriction. For example, the search results may be responsive to the query but only inclusive of those content files that are capable of being transmitted over the network 120 or executable by the mobile device 110.

Following delivery of the search results in step 220, the personal computer 130 may commence with predictive content retrieval in step 230. By predictively retrieving the content for delivery to the mobile device 110 prior to the content being requested, the content may more immediately be delivered to the mobile device 110 by personal computer 130. Predictive content retrieval may involve any of the predictive methodologies discussed in the context of FIG. 1. Predictive content retrieval may also take place in the context of content reformatting.

In step 240, a request for a particular piece of content is received by the personal computer 130 from mobile device 110. This request for content is generated and delivered to the personal computer 130 following delivery of search results in step 220. Content is then delivered to the mobile device 110 by the personal computer 130 in step 250. In some embodiments, portions of content may be preemptively delivered to the mobile device 110 to even further expedite content delivery.

Additional steps may be implemented with respect to the method 200 of FIG. 2. Steps may take place in the order reflected by FIG. 2, concurrent with other steps, or in another order as may be derived by one skilled in the art. The aforementioned method may be executed by a processor at a computing device. The computing device may execute this method through the processing of a computer program embodied in a computer-readable storage medium. The storage medium is inclusive of media such as a CD, memory, floppy disk, flash memory, and hard drive.

While the present invention has been described in connection with a series of preferred embodiments, these descriptions are not intended to limit the scope of the invention to the particular forms set forth herein. For example, any number of the functionalities described herein may be distributed to one or more computing devices or offloaded to or combined with other devices performing other primary functionalities. To the contrary, the present descriptions are intended to cover such alternatives, modifications, and equivalents as may be included within the spirit and scope of the invention as defined by the appended claims and otherwise appreciated by one of ordinary skill in the art.

What is claimed is:

1. A method of operating a server device comprising:
receiving, from a mobile device, behavioral information, the behavioral information reflecting user behavior of a user associated with the mobile device;
determining an accuracy rate for previously predicted content, the previously predicted content determined by a predictive model based on previous behavioral information;
identifying a trend of content access based on the accuracy rate;
determining predicted content for the user based on the trend; and
sending, to the mobile device, prior to selection at the mobile device for the predicted content, the predicted content, wherein the predicted content comprises one or more predicted content items.

2. The method of claim 1 wherein receiving the behavioral information further comprises:
receiving a search request;
determining requested content based on the search request; and
sending the requested content to the mobile device, wherein the requested content is sent before the predicted content.

3. The method of claim 1 wherein receiving the behavioral information further comprises:
receiving history information reflecting content previously presented at the mobile device.

4. The method of claim 1 further comprising:
receiving, from a mobile device, updated behavioral information, the updated behavioral information reflecting updated user behavior of a user associated with the mobile device;
determining an updated accuracy rate for the predicted content, the predicted content determined by a predictive model based on the behavioral information;
identifying an updated trend of content access based on the updated accuracy rate;
determining, based on the updated trend, updated predicted content for the user; and
sending, to the mobile device, prior to selection at the mobile device for the updated predicted content, the updated predicted content, wherein the updated predicted content comprises one or more predicted content items.

5. The method of claim 1 wherein determining the predicted content further comprises:
receiving device capability information identifying capabilities of the mobile device; and
performing an action based on the device capability information, the action chosen from the group consisting of:
omitting ones of the one or more predicted content items, and
reformatting ones of the one or more predicted content items.

6. The method of claim 1 wherein determining the predicted content further comprises:
receiving user profile information identifying user preferences of the user associated with the mobile device; and
performing an action based on the user profile information, the action chosen from the group consisting of:

omitting ones of the one or more predicted content items, and reformatting ones of the one or more predicted content items.

7. The method of claim 1 wherein determining the predicted content further comprises:

receiving application profile information identifying software applications available at the mobile device; and performing an action based on the application profile information, the action chosen from the group consisting of:

omitting ones of the one or more predicted content items, and reformatting ones of the one or more predicted content items.

8. The method of claim 1 wherein determining the predicted content further comprises:

determining network bandwidth information identifying available network bandwidth between the mobile device and the server device; and determining the predicted content based on network bandwidth information.

9. The method of claim 1 wherein determining the predicted content further comprises:

determining the predicted content according to a distribution curve according to a file location of the predicted content in a file structure.

10. The method of claim 1 wherein sending the predicted content further comprises:

determining network condition information identifying network conditions between the mobile device and the server device prior to sending the predicted content; and reformatting, based on the network condition information, ones of the one or more predicted content items.

11. The method of claim 1 wherein sending the predicted content further comprises:

sending the predicted content over a cellular network.

12. The method of claim 1 wherein sending the predicted content further comprises:

sending the predicted content over the Internet.

13. The method of claim 1 wherein the one or more predicted content items are chosen from the group consisting of an audio item, an image item, a video item, and a document item.

14. A method of operating a mobile device comprising:

sending, to a server device, behavioral information, the behavioral information reflecting user behavior of a user associated with the mobile device;

receiving, from the server device, predicted content, the predicted content determined by the server device based on a trend, the trend identified based on an accuracy rate of previously predicted content, the previously predicted content previously provided to the mobile device based on previously received behavioral information;

storing the predicted content in memory;

selecting, by the mobile device, the predicted content;

accessing the predicted content from the memory; and presenting the predicted content, wherein the predicted content comprises one or more predicted content items and wherein the predicted content is received prior to selection of the predicted content.

15. The method of claim 14 wherein sending information reflecting the user behavior further comprises:

sending a search request; and receiving requested content at the mobile device, wherein the requested content is received before the predicted content.

16. The method of claim 14 wherein sending the behavioral information further comprises:

sending history information reflecting content previously presented at the mobile device.

17. The method of claim 14 wherein sending the behavioral information further comprises:

sending updated behavioral information; and receiving updated predicted content, the updated predicted content determined by the server device based on an updated trend of content access.

18. The method of claim 14 wherein receiving the predicted content further comprises:

sending device capability information identifying capabilities of the mobile device; and receiving the predicted content, ones of the one or more predicted content items reformatted at the server device based on the device capability information.

19. The method of claim 14 wherein receiving the predicted content further comprises:

sending user profile information identifying user preferences of the user associated with the mobile device; and receiving the predicted content, ones of the one or more predicted content items reformatted at the server device based on the user profile information.

20. The method of claim 14 wherein receiving the predicted content further comprises:

sending application profile information identifying software applications available at the mobile device; and receiving the predicted content, ones of the one or more predicted content items reformatted at the server device based on the application profile information.

21. The method of claim 14 wherein receiving the predicted content further comprises:

sending information to the server device enabling the server device to determine network bandwidth information identifying available network bandwidth between the mobile device and the server device; and receiving the predicted content, the predicted content determined based on network bandwidth information.

22. The method of claim 14 wherein receiving the predicted content further comprises:

receiving the predicted content, the predicted content determined according to a distribution curve according to a file location of the predicted content in a file structure.

23. The method of claim 14 wherein receiving the predicted content further comprises:

sending information to the server device enabling the server device to determine network condition information identifying network conditions between the mobile device and the server device prior to sending the predicted content; and receiving the predicted content, ones of the one or more predicted content items reformatted at the server device based on the network condition information.

24. The method of claim 14 wherein receiving the predicted content further comprises:

receiving the predicted content over a cellular network.

25. The method of claim 14 wherein receiving the predicted content further comprises:

receiving the predicted content over the Internet.

26. The method of claim 14 wherein the one or more predicted content items are chosen from the group consisting of an audio item, an image item, a video item, and a document item.

27. A server device comprising:

a processor and memory operable to:

receive, from a mobile device, behavioral information, the behavioral information reflecting user behavior of a user associated with the mobile device;

determine an accuracy rate for previously predicted content, the previously predicted content determined by a predictive model based on previous behavioral information;

identify a trend of content access based on the accuracy rate;

determine predicted content for the user based on the trend; and send, to the mobile device, prior to selection at the mobile device for the predicted content, the predicted content, wherein the predicted content comprises one or more predicted content items.

28. The server device of claim 27 where in order to receive the behavioral information the server device is further operable to:

receive a search request;

determine requested content based on the search request; and send the requested content to the mobile device, wherein the requested content is sent before the predicted content.

29. The server device of claim 27 where in order to receive the behavioral information the server device is further operable to:

receive history information reflecting content previously presented at the mobile device.

30. The server device of claim 27 where in order to receive the behavioral information the server device is further operable to:

receive, from a mobile device, updated behavioral information, the updated behavioral information reflecting updated user behavior of a user associated with the mobile device;

determine an updated accuracy rate for the predicted content, the predicted content determined by a predictive model based on the behavioral information;

identify an updated trend of content access based on the updated accuracy rate;

determine, based on the updated trend, updated predicted content for the user; and sending, to the mobile device, prior to selection at the mobile device for the updated predicted content, the updated predicted content, wherein the updated predicted content comprises one or more predicted content items.

31. The server device of claim 27 where in order to determine the predicted content the server device is further operable to:

receive device capability information identifying capabilities of the mobile device; and perform an action based on the device capability information, the action chosen from the group consisting of:
  omit ones of the one or more predicted content items, and
  reformat ones of the one or more predicted content items.

32. The server device of claim 27 where in order to determine the predicted content the server device is further operable to:

receive user profile information identifying user preferences of the user associated with the mobile device; and perform an action based on the user profile information, the action chosen from the group consisting of:
  omit ones of the one or more predicted content items, and
  reformat ones of the one or more predicted content items.

33. The server device of claim 27 where in order to determine the predicted content the server device is further operable to:

receive application profile information identifying software applications available at the mobile device; and perform an action based on the application profile information, the action chosen from the group consisting of:
  omit ones of the one or more predicted content items, and
  reformat ones of the one or more predicted content items.

34. The server device of claim 27 where in order to determine the predicted content the server device is further operable to:

determine network bandwidth information identifying available network bandwidth between the mobile device and the server device; and determine the predicted content based on network bandwidth information.

35. The server device of claim 27 where in order to determine the predicted content the server device is further operable to:

determine the predicted content according to a distribution curve according to a file location of the predicted content in a file structure.

36. The server device of claim 27 where in order to send the predicted content the server device is further operable to:

determine network condition information identifying network conditions between the mobile device and the server device prior to sending the predicted content; and reformat, based on the network condition information, ones of the one or more predicted content items.

37. The server device of claim 27 where in order to send the predicted content the server device is further operable to:

send the predicted content over a cellular network.

38. The server device of claim 27 where in order to send the predicted content the server device is further operable to:

send the predicted content over the Internet.

39. The server device of claim 27 wherein the one or more predicted content items are chosen from the group consisting of an audio item, an image item, a video item, and a document item.

40. A mobile device comprising:

a processor and memory operable to:
  send, to a server device, behavioral information, the behavioral information reflecting user behavior of a user associated with the mobile device;
  receive, from the server device, predicted content, the predicted content determined by the server device based on a trend, the trend identified based on an accuracy rate of previously predicted content, the previously predicted content previously provided to the mobile device based on previously received behavioral information;
  store the predicted content in the memory;
  select, by the mobile device, the predicted content;
  access the predicted content from the memory; and
  present the predicted content, wherein the predicted content comprises one or more predicted content items and wherein the predicted content is received prior to selection of the predicted content.

41. The mobile device of claim 40 where in order to send information reflecting the user behavior the mobile device is further operable to:
 send a search request; and
 receive requested content at the mobile device, wherein the requested content is received before the predicted content.

42. The mobile device of claim 40 where in order to send the behavioral information the mobile device is further operable to:
 send history information reflecting content previously presented at the mobile device.

43. The mobile device of claim 40 where in order to send the behavioral information the mobile device is further operable to:
 send updated behavioral information; and
 receive updated predicted content, the updated predicted content determined by the server device based on an updated trend of content access.

44. The mobile device of claim 40 where in order to receive the predicted content the mobile device is further operable to:
 send device capability information identifying capabilities of the mobile device; and
 receive the predicted content, ones of the one or more predicted content items reformatted at the server device based on the device capability information.

45. The mobile device of claim 40 where in order to receive the predicted content the mobile device is further operable to:
 send user profile information identifying user preferences of the user associated with the mobile device; and
 receive the predicted content, ones of the one or more predicted content items reformatted at the server device based on the user profile information.

46. The mobile device of claim 40 where in order to receive the predicted content the mobile device is further operable to:
 send application profile information identifying software applications available at the mobile device; and
 receive the predicted content, ones of the one or more predicted content items reformatted at the server device based on the application profile information.

47. The mobile device of claim 40 where in order to receive the predicted content the mobile device is further operable to:
 send information to the server device enabling the server device to determine network bandwidth information identifying available network bandwidth between the mobile device and the server device; and
 receive the predicted content, the predicted content determined based on network bandwidth information.

48. The mobile device of claim 40 where in order to receive the predicted content the mobile device is further operable to:
 receive the predicted content, the predicted content determined according to a distribution curve according to a file location of the predicted content in a file structure.

49. The mobile device of claim 40 where in order to receive the predicted content the mobile device is further operable to:
 sending information to the server device enabling the server device to determine network condition information identifying network conditions between the mobile device and the server device prior to sending the predicted content; and
 receive the predicted content, ones of the one or more predicted content items reformatted at the server device based on the network condition information.

50. The mobile device of claim 40 where in order to receive the predicted content the mobile device is further operable to:
 receive the predicted content over a cellular network.

51. The mobile device of claim 40 where in order to receive the predicted content the mobile device is further operable to:
 receive the predicted content over the Internet.

52. The mobile device of claim 40 wherein the one or more predicted content items are chosen from the group consisting of an audio item, an image item, a video item, and a document item.

\* \* \* \* \*